United States Patent

Shimizu et al.

[11] Patent Number: 6,084,037
[45] Date of Patent: Jul. 4, 2000

[54] EPOXY RESIN COMPOSITION AND SEMICONDUCTOR DEVICE

[75] Inventors: Hisashi Shimizu; Minoru Takei; Masachika Yoshino; Toshio Shiobara, all of Usui-gun, Japan

[73] Assignee: Shin -Etsu Chemical Co., Ltd., Japan

[21] Appl. No.: 08/993,403

[22] Filed: Dec. 18, 1997

[30] Foreign Application Priority Data

Dec. 19, 1996 [JP] Japan ..................................... 8-354530

[51] Int. Cl.$^7$ .................................................. C08F 283/10
[52] U.S. Cl. ........................ 525/476; 523/443; 523/453; 523/456; 524/86; 524/251; 528/90; 528/94; 528/109; 528/114; 528/374
[58] Field of Search ..................................... 523/443, 453, 523/456; 524/86, 251; 525/476; 528/90, 94, 109, 114, 374

[56] References Cited

U.S. PATENT DOCUMENTS

| 4,981,728 | 1/1991 | Homma et al. | 427/386 |
| 4,985,751 | 1/1991 | Shiobara et al. | 357/72 |
| 5,336,703 | 8/1994 | Homma et al. | 523/435 |
| 5,798,400 | 8/1998 | Tokunaga et al. | 523/442 |
| 5,854,316 | 12/1998 | Shimizu et al. | 523/442 |

FOREIGN PATENT DOCUMENTS

| 57-100128 | 6/1982 | Japan . |
| 58-76420 | 5/1983 | Japan . |
| 58-103525 | 6/1983 | Japan . |
| 6-18853 | 3/1994 | Japan . |
| 410053641 | 2/1998 | Japan . |

OTHER PUBLICATIONS

English Abstract for JP–B 18853/1994.
English Abstract for JP–A 103525/1983.
English Abstract for JP–A 76420/1983.
English Abstract for JP–A 100128/1982.

*Primary Examiner*—Robert Dawson
*Assistant Examiner*—Jeffrey B. Robertson
*Attorney, Agent, or Firm*—Millen, White, Zelano & Branigan, P.C.

[57] ABSTRACT

In an epoxy resin composition comprising an epoxy resin, a curing agent, and an inorganic filler, there are blended a salt of trimellitic anhydride with 1,8-diazabicyclo(5.4.0) undecene-7 as a curing accelerator and a mercapto-containing silane coupling agent. The composition is shelf stable and smoothly flowing and cures into a product having improved adhesion, moisture resistance and electrical properties. The composition is suitable for the encapsulation of semiconductor devices.

2 Claims, No Drawings

EPOXY RESIN COMPOSITION AND SEMICONDUCTOR DEVICE

This invention relates to an epoxy resin composition which is shelf stable, smoothly flowing, and readily moldable and cures into a product having moisture resistance and adhesion and a semiconductor device encapsulated with a cured product thereof.

BACKGROUND OF THE INVENTION

The current mainstream in the semiconductor industry resides in diodes, transistors, ICs, LSIs and VLSIs of the resin encapsulation type. Epoxy resin compositions are typically used as the encapsulating resin because they generally have superior moldability, adhesion, electrical properties, mechanical properties, and moisture resistance to other thermosetting resins. It is thus a common practice to encapsulate semiconductor devices with epoxy resin compositions. Nowadays, semiconductor devices have an increasing degree of integration and the chip size is accordingly increasing. On the other hand, packages of smaller outer size are desired in order to comply with the size and weight reduction of electronic equipment. With regard to the attachment of semiconductor parts to circuit boards, the surface mounting of semiconductor parts is widely employed since the surface mounting can accommodate demands for a higher density of parts on boards.

When semiconductor devices are surface mounted, however, it is commonly employed to immerse the semiconductor devices entirely in a solder bath or pass the semiconductor devices through a hot zone where solder is melted. Due to the thermal shocks encountered in such steps, the encapsulating resin layer will crack and the encapsulating resin can separate from the lead frame or chip at their interface. Such cracks and separation become more outstanding if the encapsulating resin layer on the semiconductor device has absorbed moisture prior to the thermal shocks upon surface mounting. In practical working steps, the moisture absorption of the encapsulating resin layer is inevitable. Then the epoxy resin-encapsulated semiconductor devices can lose reliability at the end of surface mounting. Several attempts were made in the prior art to insure reliability, for example, by increasing the filler loading to reduce moisture absorption for avoiding the risk of popcorning, by reducing the viscosity of the epoxy resin composition for facilitating the formation of thin packages, and by using fast curing catalysts for improving productivity and molding cycles.

However, prior art curing catalysts such as tertiary amine compounds, tertiary phosphine compounds and derivatives thereof give rise to the problem of a viscosity increase during mixing.

Imidazole derivatives are also known as a curing accelerator for epoxy resin compositions. JP-A 76420/1983, 103525/1983 and 100128/1982 and JP-B 18853/1994 disclose that an epoxy resin composition having good shelf stability and curing into a product having improved adhesion is obtained using curing agents obtained by reacting 2-methylimidazole with pyromellitic anhydride and trimellitic anhydride.

These curing catalysts, however, have poor electrical properties and tend to show an increased percentage of rejects in a reliability test. Simply blending such a curing agent with a curing accelerator is difficult to obtain an epoxy resin composition which is shelf stable and smoothly flowing and cures into a product having moisture resistance and adhesion.

SUMMARY OF THE INVENTION

Therefore, an object of the present invention is to provide an epoxy resin composition which is shelf stable and smoothly flowing and will cure into a product having improved adhesion and moisture resistance. Another object of the invention is to provide a semiconductor device encapsulated with the epoxy resin composition.

The present invention is directed to an epoxy resin composition comprising an epoxy resin, a curing agent, and an inorganic filler. We have found that when there are blended in the epoxy resin composition a reaction product of trimellitic anhydride with 1,8-diazabicyclo(5.4.0) undecene-7 represented by the following formula (1) as a curing accelerator and a mercapto-containing organoalkoxysilane compound represented by the following formula (2) as a silane coupling agent, the resulting epoxy resin composition is shelf stable and smoothly flowing and will cure into a product having improved adhesion, moisture resistance and electrical properties.

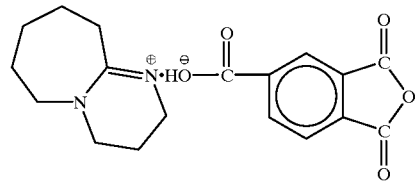

(1)

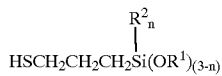

(2)

In formula (2), $R^1$ and $R^2$, which may be identical or different, are substituted or unsubstituted alkyl groups having 1 to 4 carbon atoms. Letter n is equal to 0 or 1.

Accordingly, the present invention provides an epoxy resin composition comprising an epoxy resin, a curing agent, an inorganic filler, a salt of trimellitic anhydride with 1,8-diazabicyclo(5.4.0)undecene-7, and a mercapto-containing silane coupling agent.

The present invention also provides a semiconductor device encapsulated with a cured product of the epoxy resin composition.

DESCRIPTION OF THE PREFERRED EMBODIMENTS

The epoxy resin composition of the present invention contains an epoxy resin, a curing agent, and an inorganic filler as essential components.

The epoxy resin used herein is not critical insofar as it has at least two epoxy groups in a molecule. Examples of the epoxy resin include bisphenol A type epoxy resins, novolak type epoxy resins, alicyclic epoxy resins, glycidyl type epoxy resins, biphenyl type epoxy resins, naphthalene ring-containing epoxy resins, cyclopentadiene-containing epoxy resins, and polyfunctional epoxy resins and mixtures thereof. Among these epoxy resins, biphenyl type epoxy resins and naphthalene ring-containing epoxy resins are preferred because of the possible high loading of an inorganic filler. Those epoxy resins having a softening point of 50 to 100° C. and an epoxy equivalent of 100 to 400 are desirable. Brominated epoxy resins may be used where flame retardancy is desired.

The curing agent may be selected from conventional well-known compounds used as a curing agent for epoxy resins although phenolic resins are typically used. Exemplary phenolic resins are those having at least two phenolic hydroxyl groups such as phenol novolak resins, triphenol methane resins, phenol aralkyl resins, naphthalene ring-containing phenol resins, cyclopentadiene-containing phenol resins, and terpene ring-containing phenol resins. Those phenolic resins having a softening point of 60 to 120° C. and a hydroxyl equivalent of 90 to 150 are desirable.

The phenolic resin is used in such an amount as to give an equivalent ratio of epoxy group to hydroxyl group of from 0.5/1 to 2/1. Usually the phenolic resin is blended in an amount of 30 to 100 parts, preferably 40 to 70 parts by weight per 100 parts by weight of the epoxy resin. Less than 30 parts of the phenolic resin on this basis would fail to provide strength. In excess of 100 parts of the phenolic resin, the unreacted phenolic resin would be left behind to adversely affect moisture resistance.

Also blended in the epoxy resin composition is an inorganic filler. The filler is effective for reducing the coefficient of expansion of an encapsulant for thereby reducing the stress applied to semiconductor devices. The inorganic filler may be selected from those commonly used in conventional epoxy resin compositions. Often used are fused silica and crystalline silica in ground and spherical forms. Alumina, silicon nitride, and aluminum nitride are also useful. The preferred inorganic filler has a mean particle size of about 5 to 40 µm, more preferably about 10 to 30 µm. The mean particle size may be measured, for example, as a weight-average value by a laser beam diffraction method. Desirably the inorganic filler is surface treated with a silane coupling agent before use.

Also preferably, the inorganic filler is blended in an amount of about 200 to 900 parts, preferably about 400 to 850 parts by weight per 100 parts by weight of the epoxy resin and curing agent combined. On this basis, less than 200 parts of the filler would allow the composition to have an increased coefficient of expansion which can increase the stress applied to semiconductor devices and thus deteriorate the properties thereof. More than 900 parts of the filler would cause the composition to increase its viscosity to exacerbate moldability.

According to the invention, a curing accelerator is blended in the epoxy resin composition mentioned above. The curing accelerator used herein is a reaction product or salt of formula (1) obtained by reacting trimellitic anhydride with 1,8-diazabicyclo(5.4.0)undecene-7 according to the following reaction scheme.

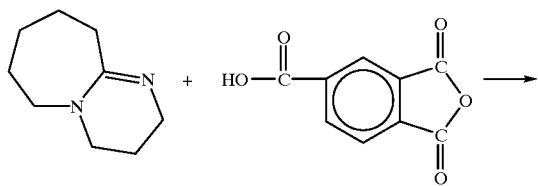

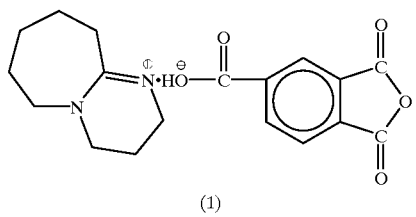

(1)

More particularly, the salt of trimellitic anhydride with 1,8-diazabicyclo(5.4.0)undecene-7 serving as the curing accelerator is prepared as follows. Trimellitic anhydride is reacted with 1,8-diazabicyclo(5.4.0)undecene-7 in a solvent. Exemplary reaction solvents include acetone, methylethylketone, methylisobutylketone, methylcellosolve, dimethylsulfoxide, dimethylformamide, diethylene glycol, and pyridine, with the acetone being preferred. A mixture of acetone with another solvent is also useful. The reaction temperature is 10 to 60° C., preferably 15 to 25° C.

The amount of the solvent, typically acetone is 100 to 2,000 parts, preferably 200 to 1,300 parts by weight per 152 parts by weight (1 mol) of 1,8-diazabicyclo(5.4.0)undecene-7. With less than 100 parts of the solvent on this basis, the resulting salt would precipitate to obstruct the uniform progress of reaction. More than 2,000 parts of the solvent would increase the burden of removing the solvent at the end of reaction. The amount of trimellitic anhydride used is 173 to 230 parts (0.9 to 1.2 mol), preferably 192 parts by weight (1.0 mol) per 152 parts by weight (1 mol) of 1,8-diazabicyclo(5.4.0)undecene-7.

At the end of reaction, the solvent is removed. At this point, care should be taken so as to prevent the reaction product from absorbing water. The acid anhydride reaction product undergoes ring opening and converts into a dicarboxylic acid derivative if it picks up moisture. The dicarboxylic acid derivative resulting from ring opening is difficult to use as a curing catalyst for an epoxy resin composition because the derivative is incompatible with other components. The solvent is removed at a temperature of 90 to 130° C., preferably 100 to 120° C. At solvent removing temperatures below 90° C., it is difficult to take out the reaction product in a molten state. Solvent removal at temperatures above 130° C. is undesirable from the standpoints of operation and working environment. The solvent removal may be done in vacuum.

For the confirmation of the reaction product by instrumental analysis, the measurement of a melting point is useful. The reaction product has a melting point of 90 to 110° C., preferably 95 to 100° C.

Before the reaction product is used as a curing catalyst in the epoxy resin composition, it may be finely divided into a powder or dispersed in a phenolic resin.

The amount of the curing catalyst used is preferably 0.1 to 10 parts, more preferably 0.3 to 5 parts by weight per 100 parts by weight of the epoxy resin and curing agent combined. Less than 0.1 part of the curing catalyst would be ineffective for its purpose of completing curing within a short time. With more than 10 parts of the curing catalyst, the curing rate would become too high to mold a satisfactory part, shelf stability would be adversely affected, and the cured product tends to have poor electrical properties as demonstrated by a larger amount of chlorine extracted with water from the cured product.

In the practice of the invention, another catalyst is used in combination with the above-mentioned curing catalyst if desired. Examples of the other catalyst include imidazole and derivatives thereof, phosphine derivatives such as triphenylphosphine, tris-p-methoxyphenylphosphine, and tricyclohexylphosphine, and cycloamidine derivatives such as 1,8-diazabicyclo(5.4.0)undecene-7.

Further blended in the epoxy resin composition of the invention is a mercapto-containing silane coupling agent, i.e., a mercapto-containing organoalkoxysilane compound having 2 or 3 alkoxy groups in a molecule, represented by the following formula (2). The silane coupling agent serves to improve adhesion.

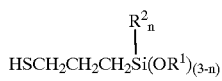
(2)

In formula (2), $R^1$ and $R^2$ are independently substituted or unsubstituted alkyl groups having 1 to 4 carbon atoms, for example, methyl, ethyl, propyl, isopropyl, butyl, isobutyl and tert-butyl groups. $R^1$ may also be an alkoxy-substituted alkyl groups such as methoxymethyl, methoxy-ethyl, ethoxymethyl, and ethoxyethyl. Letter n is equal to 0 or 1.

Examples of the silane coupling agent of formula (2) are given below.

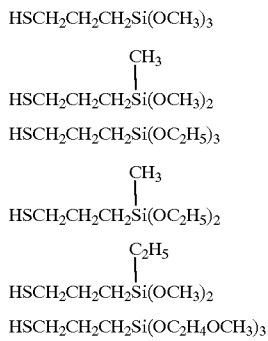

The amount of the mercapto-containing silane coupling agent blended is preferably 0.2 to 3 parts, more preferably 0.5 to 2 parts by weight per 100 parts by weight of the epoxy resin and curing agent combined. Less than 0.2 part of the mercapto-containing silane coupling agent on this basis would be ineffective for improving the adhesion of the epoxy resin composition. Epoxy resin compositions containing more than 3 parts of the mercapto-containing silane coupling agent would lose fluidity and storage stability. Another silane coupling agent may be used in admixture with the mercapto-containing silane coupling agent.

In addition to the aforementioned essential components, a silicone compound as a flexibility imparting agent may be added to the epoxy resin composition for stress reducing purposes. There may be blended silicone compounds such as silicone rubber powder, silicone gel, and organic resin-silicone polymer block copolymers. Instead of adding the silicone flexibility imparting agent, the inorganic filler may be treated on the surface with two part type silicone rubber and silicone gel. Usually such a silicone flexibility imparting agent is used in an amount of 0.5 to 10% by weight, preferably 1 to 5% by weight of the overall system. Less than 0.5% of the silicone flexibility imparting agent would fail to provide impact resistance whereas more than 10% of the silicone flexibility imparting agent would adversely affect mechanical strength.

Insofar as the objects of the invention are not impeded, the epoxy resin composition of the invention may further contain various additives. Exemplary additives are mold release agents such as carnauba wax, higher fatty acids and synthetic wax, thermoplastic resins such as MBS resins, antimony oxide, and phosphorus compounds.

The epoxy resin composition of the invention is prepared by blending predetermined amounts of the above-mentioned essential and optional components, for example, by mixing in a kneader, roll mill or extruder heated at 70 to 95° C., followed by cooling and comminution. The order of blending the components is not critical.

The epoxy resin composition thus obtained is useful in encapsulating various semiconductor devices such as ICs, LSIs, transistors, thyristors, and diodes therewith. It is also useful in the manufacture of printed circuit boards. Upon encapsulation of semiconductor devices, the epoxy resin composition is preferably molded at a temperature of 150 to 180° C. and post cured at a temperature of 150 to 180° C. for 2 to 16 hours.

There has been described an epoxy resin composition using a salt of trimellitic anhydride with 1,8-diazabicyclo-(5.4.0)undecene-7 as a curing accelerator and a mercapto-containing silane coupling agent. The composition has improved shelf stability and fluidity and cures into a product having improved adhesion, moisture resistance and electrical properties. A semiconductor device encapsulated with the cured product is highly reliable.

EXAMPLE

Examples of the present invention are given below by way of illustration and not by way of limitation. All parts are by weight.

Synthesis Example

A 3-liter four-necked flask equipped with a thermometer, stirrer, and reflux condenser was charged with 152 parts of 1,8-diazabicyclo(5.4.0)undecene-7 (trade name DBU) and 400 parts of acetone. By stirring the contents, 1,8-diazabicyclo(5.4.0)undecene-7 was dissolved in acetone. A solution of 192 parts of trimellitic anhydride (by Tokyo Kasei K.K.) in 900 parts of acetone was added dropwise to the flask through a dropping funnel. After the completion of addition, the flask was maintained at 20° C. for one hour for reaction. Thereafter, the acetone was removed by stripping in vacuum. The reaction solution was tapped in a molten state at a temperature of 90 to 120° C., obtaining a brown solid Reaction Product A. Reaction Product A had a melting point of 90 to 100° C.

Examples 1–4 and Comparative Examples 1–5

Epoxy resin compositions were prepared by blending an epoxy resin, a phenolic resin, and Reaction Product A in amounts as reported in Table 1 together with 1.5 parts of Wax E, 1 part of carbon black, 6 parts of brominated epoxy resin, 7 parts of antimony trioxide, 500 parts of fused quartz powder, and γ-mercaptopropyltrimethoxysilane as a silane coupling agent in an amount as reported in Table 1 and uniformly melt mixing the blend in a hot two-roll mill, followed by cooling and comminution.

For comparison purposes, epoxy resin compositions were similarly prepared using unreacted DBU and a mercaptofree silane coupling agent (γ-glycidoxypropyltrimethoxysilane).

Each of the epoxy resin compositions was measured for various properties. The results are shown in Table 1.

(1) Spiral flow

Using a mold as prescribed by the EMMI standard, spiral flow was measured at 175° C. and 70 kg/cm².

(2) Hot hardness

A test bar of 10×4×100 mm was formed by molding the composition at 175° C., 70 kg/cm² for 90 seconds. It was measured for hot hardness by a Barcol hardness tester.

(3) Shelf stability

The composition was allowed to stand at 25° C. until the spiral flow value reached 80% of the initial value. The shelf stability is represented by the number of days passed.

(4) Gel time

The gel time of the composition was measured on a hot plate at 175° C.

(5) Melt viscosity

Using a Koka type flow tester (Shimazu Mfg. K.K.), melt viscosity was measured at 175° C.

(6) Adhesion

The composition was molded onto copper and nickel plates at 175° C., 70 kg/cm² for 120 seconds and post cured at 180° C. for 4 hours to form resin discs of 15 mm diameter and 5 mm high on the plates. Using a push-pull gage, a force necessary to peel the disc from the plate was measured.

pling agent show a less viscosity increase during mixing, good flow and stability during storage and cure into firmly bonding products, as compared with epoxy resin compositions free of such components.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An epoxy resin composition comprising:

an epoxy resin, a curing agent comprising about 30 to 100 parts by weight of a phenolic resin per 100 parts by weight of the epoxy resin, an inorganic filler comprising about 200 to 900 parts by weight per 100 parts by weight of the epoxy resin and curing agent combined, a curing accelerator comprising a reaction product of trimellitic anhydride with 1,8-diazabicyclo (5.4.0) undecene-7 represented by the following formula (I):

TABLE 1

|  |  | Example |  |  |  | Comparative Example |  |  |  |  |
|---|---|---|---|---|---|---|---|---|---|---|
|  |  | 1 | 2 | 3 | 4 | 1 | 2 | 3 | 4 | 5 |
| Components (pbw) | Epoxy resin A | 60.2 | 0 | 60.2 | 0 | 60.2 | 60.2 | 60.2 | 0 | 0 |
|  | Epoxy resin B | 0 | 59.1 | 0 | 59.1 | 0 | 0 | 0 | 59.1 | 59.1 |
|  | Phenolic resin A | 33.8 | 34.9 | 33.8 | 34.9 | 33.8 | 33.8 | 33.8 | 34.9 | 34.9 |
|  | KBM-803 | 1.5 | 1.5 | 0.8 | 0.8 | 0 | 1.5 | 0 | 1.5 | 0 |
|  | KBM-403 | 0 | 0 | 0.8 | 0.8 | 0 | 0 | 1.5 | 0 | 1.5 |
|  | Reaction Product A | 2.5 | 2.5 | 2.5 | 2.5 | 0 | 0 | 2.5 | 0 | 2.5 |
|  | DBU (unreacted) | 0 | 0 | 0 | 0 | 0.8 | 0.8 | 0 | 0.8 | 0 |
| Properties | Spiral flow | 75 | 86 | 77 | 89 | 68 | 65 | 71 | 69 | 72 |
|  | Hot hardness @ 175° C./90s | 85 | 84 | 84 | 82 | 86 | 87 | 82 | 87 | 83 |
|  | Shelf stability (day) | 10< | 10< | 10< | 10< | 6 | 5 | 10< | 6 | 10< |
|  | Gel time (sec.) | 30 | 35 | 31 | 36 | 26 | 25 | 29 | 27 | 35 |
|  | Melt viscosity (poise) | 260 | 210 | 250 | 200 | 370 | 380 | 270 | 240 | 210 |
|  | Bonding force (kg) Copper plate | 36 | 35 | 34 | 32 | 9 | 13 | 19 | 14 | 16 |
|  | Nickel plate | 23 | 24 | 21 | 22 | 3 | 7 | 11 | 8 | 9 |

Epoxy resin A: epoxidized cresol novolak resin, softening point 55° C., epoxy equivalent 200 (EOCN-1020-55 by Nippon Kayaku K.K.)

Epoxy resin B: epoxidized biphenol derivative, softening point 105° C., epoxy equivalent 190 (YX4000H by Yuka Shell K.K.)

Phenolic resin A: phenol novolak resin, softening point 80° C., phenol equivalent 110 (TD-2131 by Dai-Nihon Ink Chemical Industry K.K.)

DBU: 1,8-diazabicyclo(5.4.0)undecene-7

KBM-803: γ-mercaptopropyltrimethoxysilane (Shin-Etsu Chemical Co., Ltd.)

KBM-403: γ-glycidoxypropyltrimethoxysilane (Shin-Etsu Chemical Co., Ltd.)

It is evident from Table 1 that epoxy resin compositions using a salt of trimellitic anhydride with 1,8-diazabicyclo (5.4.0)undecene-7 and a mercapto-containing silane cou-

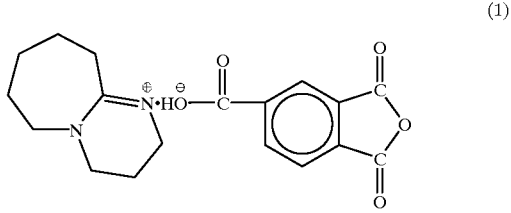

(1)

and a coupling agent comprising a mercapto-containing organoalkoxysilane compound represented by the following formula (2):

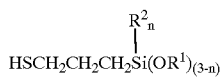
(2)

wherein $R^1$ and $R^2$ are independently substituted or unsubstituted alkyl groups having 1 to 4 carbon atoms, and letter n is equal to 0 or 1.

2. An epoxy resin composition as claimed in claim 1, wherein the curing accelerator is present in an amount of from 0.1 to 10 parts by weight, and the mercapto-containing silane coupling agent is present in an amount of from 0.2 to 3 parts by weight, each per 100 parts by weight of the epoxy resin and the curing agent combined.

* * * * *